(12) United States Patent
Wang et al.

(10) Patent No.: US 11,269,224 B2
(45) Date of Patent: Mar. 8, 2022

(54) OPTICAL DEVICE, DISPLAY APPARATUS AND METHOD FOR DRIVING SAME

(71) Applicant: BOE TECHNOLOGY GROUP CO., LTD., Beijing (CN)

(72) Inventors: Qian Wang, Beijing (CN); Xiaochuan Chen, Beijing (CN); Wenqing Zhao, Beijing (CN); Zhongxiao Li, Beijing (CN); Xiaochen Niu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 238 days.

(21) Appl. No.: 16/089,891

(22) PCT Filed: Feb. 6, 2018

(86) PCT No.: PCT/CN2018/075460
§ 371 (c)(1),
(2) Date: Sep. 28, 2018

(87) PCT Pub. No.: WO2018/161757
PCT Pub. Date: Sep. 13, 2018

(65) Prior Publication Data
US 2020/0301214 A1 Sep. 24, 2020

(30) Foreign Application Priority Data
Mar. 10, 2017 (CN) .......................... 201710141300.5

(51) Int. Cl.
*G02F 1/1343* (2006.01)
*G02F 1/133* (2006.01)
*G02F 1/1335* (2006.01)

(52) U.S. Cl.
CPC .... *G02F 1/134309* (2013.01); *G02F 1/13306* (2013.01); *G02F 1/133526* (2013.01)

(58) Field of Classification Search
CPC ........... G02F 1/134309; G02F 1/13306; G02F 1/133526
See application file for complete search history.

(56) References Cited

U.S. PATENT DOCUMENTS

2007/0008617 A1* 1/2007 Shestak ............. G02F 1/133526
359/455
2012/0105753 A1 5/2012 Sakamoto et al.
(Continued)

FOREIGN PATENT DOCUMENTS

CN 101916014 A 12/2010
CN 102062985 A 5/2011
(Continued)

OTHER PUBLICATIONS

Chinese Office Action in Chinese Application No. 201710141300.5, dated Feb. 27, 2019 with English translation.
(Continued)

*Primary Examiner* — Nathanael R Briggs
(74) *Attorney, Agent, or Firm* — Collard & Roe, P.C.

(57) ABSTRACT

An optical assembly, a display device and a method for driving the same are provided. The optical assembly includes two substrates disposed opposite to each other, and electrodes are disposed on the two substrates respectively. Voltages are applied to the electrodes to form a transverse electric field being configured for driving liquid crystal molecules proximal to the substrates to deflect, so that liquid crystal proximal to the two substrates both form liquid crystal lenses, thereby forming a double-layer liquid crystal lens structure. Since the two substrates of a liquid crystal cell have high alignment accuracy, the electrodes on the two substrates are consistent in spatial distribution, thereby solving mura problem.

11 Claims, 3 Drawing Sheets

(56) References Cited

U.S. PATENT DOCUMENTS

| | | |
|---|---|---|
| 2014/0002759 A1 | 1/2014 | Chen et al. |
| 2014/0063386 A1 | 3/2014 | Yang et al. |
| 2015/0070336 A1 | 3/2015 | Qu et al. |
| 2016/0259187 A1 | 9/2016 | Lee et al. |
| 2018/0031908 A1 | 2/2018 | Xie |

FOREIGN PATENT DOCUMENTS

| | | | |
|---|---|---|---|
| CN | 102385195 A | | 3/2012 |
| CN | 102466941 A | | 5/2012 |
| CN | 102768448 A | * | 11/2012 |
| CN | 102768448 A | | 11/2012 |
| CN | 103091883 A | | 5/2013 |
| CN | 103472636 A | | 12/2013 |
| CN | 105388673 A | | 3/2016 |
| CN | 106647064 A | | 5/2017 |

OTHER PUBLICATIONS

International Search Report of PCT/CN2018/075460 in Chinese, dated May 9, 2018, with English translation.
Notice of Transmittal of the International Search Report of PCT/CN2018/075460 in Chinese, dated May 9, 2018.
Written Opinion of the International Searching Authority of PCT/CN2018/075460 in Chinese, dated May 9, 2018 with English translation.

* cited by examiner

US 11,269,224 B2

OPTICAL DEVICE, DISPLAY APPARATUS AND METHOD FOR DRIVING SAME

CROSS REFERENCE TO RELATED APPLICATION

This application is the National Stage of PCT/CN2018/075460 filed on Feb. 6, 2018, which claims priority under 35 U.S.C. § 119 of Chinese Application No. 201710141300.5 filed on Mar. 10, 2017, the disclosure of which is incorporated by reference.

TECHNICAL FIELD

Embodiments of the present disclosure relate to an optical assembly, a display device and a method for driving the display device.

BACKGROUND

In smart display function applications, an anti-peeping display is an application having higher demand. However, a current anti-peeping mode is fixed and cannot be switched to a sharing mode. Since a liquid crystal lens may be controlled by an electrode to adjust light, the liquid crystal lens may be used for realizing automatic switching between the anti-peeping mode and the sharing mode, but mura may be generated.

SUMMARY

The present disclosure provides an optical assembly, a display device and a method for driving the display device, to solve a problem that the mura pattern is generated in a double-layer liquid crystal lens due to low alignment accuracy of a liquid crystal cell in the prior art.

In order to solve the problem, an embodiment of the present discloses provides optical assembly, comprising: a first substrate and a second substrate, disposed opposite to each other; liquid crystals, filled between the first substrate and the second substrate; at least one set of first electrodes, disposed on the first substrate and comprising at least two first electrodes, the at least two first electrodes being configured to form a first electric field for driving liquid crystal molecules proximal to the first substrate to deflect, so as to form a first liquid crystal lens; at least one set of second electrodes, disposed on the second substrate and comprising at least two second electrodes, the at least two second electrodes being configured to form a second electric field for driving liquid crystal molecules proximal to the second substrate to deflect, so as to form a second liquid crystal lens.

An embodiment of the present discloses further provides a display device, comprising a display panel and the above-mentioned optical assembly, the optical assembly being disposed on a display side of the display panel.

An embodiment of the present discloses further provides a method for driving the above-mentioned display device, comprising: applying voltages to the at least two first electrodes of each set of the at least one set of the first electrodes, to form the first electric field for driving liquid crystal molecules proximal to the first substrate to deflect, so as to form the first liquid crystal lens; and applying voltages to the at least two second electrodes of each set of the at least one set of the second electrodes, to form the second electric field for driving liquid crystal molecules proximal to the second substrate to deflect, so as to form the second liquid crystal lens.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present disclosure, are not intended to indicate any sequence, amount or importance, but distinguish various components. The terms "comprises," "comprising," "includes," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only configured to indicate relative position relationship, and when the position of the object which is described is changed, the relative position relationship may be changed accordingly.

A liquid crystal lens is controlled by electrodes to adjust light, and a double-layer liquid crystal lens realizes a sharing angle larger than that of a single-layer liquid crystal lens. The liquid crystal lens comprises: two substrates disposed opposite to each other, liquid crystals filled between the two substrates, a plurality of stripe-shaped electrodes disposed on one of the substrates, and a plate-shaped electrode disposed on another substrate. The liquid crystal lens typically comprises a plurality of liquid crystal lens units, and each liquid crystal lens unit has a plurality of stripe-shaped electrodes therein. Voltages loaded onto the respective stripe-shaped electrodes in same liquid crystal lens unit are typically symmetrical voltages, to drive liquid crystal molecules in the liquid crystal lens unit to deflect, thereby forming a structure having optical characteristics of a lens. When it is required to form a double-layer liquid crystal lens, there may be a difference in spatial frequency between the electrodes of the two liquid crystal lenses due to the low alignment accuracy between the two liquid crystal cells, which results in severe mura problem.

Figure 1:
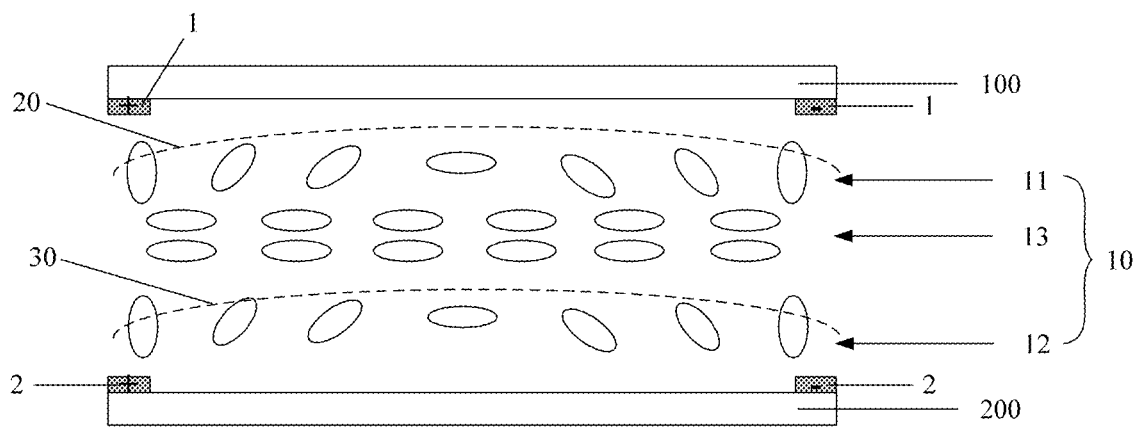
FIG. 1 is a structural schematic diagram of an optical assembly when a voltage is applied according to an embodiment of the present disclosure.
Figure 2:
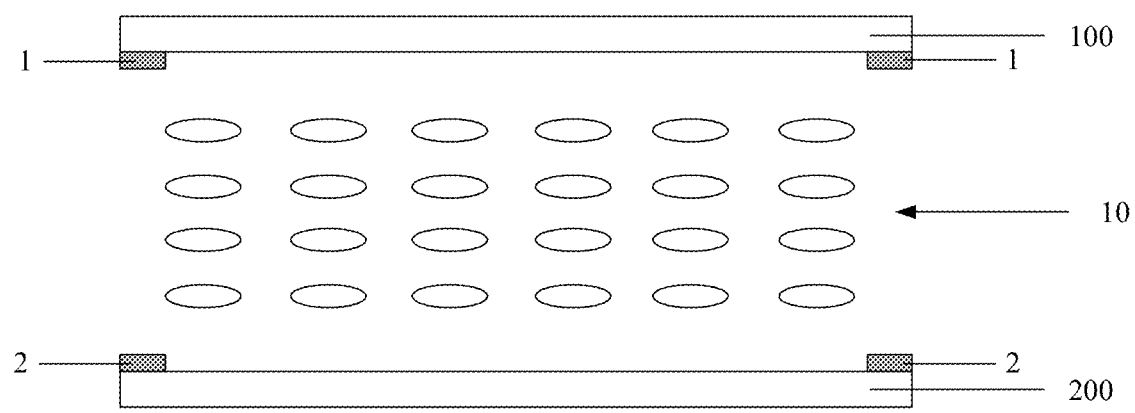
FIG. 2 is a structural schematic diagram of the optical assembly of FIG. 1 when no voltage is applied.
Figure 3:
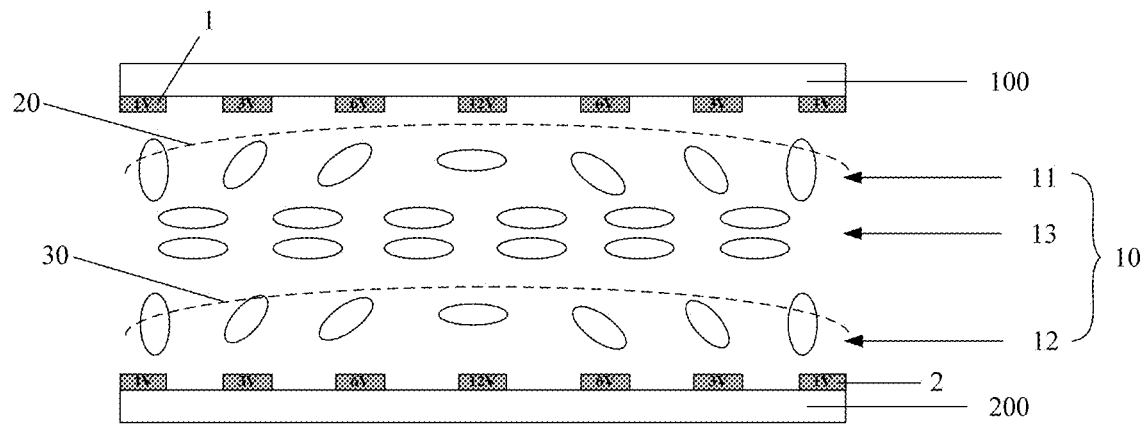
FIG. 3 is a structural schematic diagram of an optical assembly according to another embodiment of the present disclosure.

As illustrated in FIG. 1 to FIG. 3, an embodiment of the present disclosure provides an optical assembly, comprising: a first substrate 100 and a second substrate 200 disposed opposite to each other; liquid crystals 10 filled between the first substrate 100 and the second substrate 200; at least one set of first electrodes disposed on the first substrate 100, the at least one set of the first electrodes comprising at least two first electrodes 1, the at least two first electrodes 1 being configured to form a first electric field for driving liquid crystal molecules proximal to the first substrate 100 to deflect, so as to form a first liquid crystal lens 20; and at least one set of second electrodes disposed on the second substrate 200, the at least one set of the second electrodes comprising at least two second electrodes 2, the at least two second electrodes 2 being configured to form a second electric field for driving liquid crystal molecules proximal to the second substrate 200 to deflect, so as to form a second liquid crystal lens 30.

A position of at least one set of first electrodes is in one-to-one correspondence with a position of at least one set of second electrodes, so that a position of the first liquid crystal lens 20 is in one-to-one correspondence with a position of the second liquid crystal lens 30, thereby enhancing adjustment effect on light. For example, when focal points of the first liquid crystal lens 20 and the second liquid crystal lens 30 are located on a light incident side of the optical assembly, and the two are both concave lenses, a divergence angle of light can be increased. When the focal points of the first liquid crystal lens 20 and the second liquid crystal lens 30 are located on a light emission side of the optical assembly, and the two are both convex lenses, converging effect on light can be increased.

In the embodiments of the present disclosure, the liquid crystal molecules proximal to each substrate forms a liquid crystal lens by driving the liquid crystal molecules to deflect through a transverse electric field, so that a liquid crystal cell serves as a double-layer liquid crystal lens structure. Because the two substrates of the single liquid crystal cell have high alignment accuracy, the electrodes on the two substrates are ensured to be consistent in spatial distribution, thereby solving the mura problem.

In at least some embodiments, the liquid crystals 10 are selected as positive liquid crystals, and have liquid crystal molecules which are arranged along electric field lines for easy control. The single liquid crystal cell is formed by assembling two substrates and filled with the liquid crystals between the two substrates.

For convenience of description, the liquid crystals proximal to the first substrate 100 and configured for forming the first liquid crystal lens 20 are defined as upper liquid crystals 11, and the liquid crystals proximal to the second substrate 200 and configured for forming the second liquid crystal lens 30 are defined as lower liquid crystals 12.

In order to form a double-layer liquid crystal lens structure, a cell gap of the liquid crystal cell is increased by interposing intermediate liquid crystals 13 between the upper liquid crystals 11 and the lower liquid crystals 12, the intermediate liquid crystals 13 have the liquid crystal molecules not deflected, thereby preventing deflection of the liquid crystal molecules of the upper liquid crystals 11 from being affected by deflection of the liquid crystal molecules of the lower liquid crystals 12. A reason why the liquid crystal molecules of the intermediate liquid crystals 13 are not deflected is that an electric field generated by the electrodes on the first substrate 100 or the second substrate 200 is relatively weakly distributed in a region where the intermediate liquid crystals 13 are located while the liquid crystal cell is thick enough, and the electric field may almost be ignored.

In at least some embodiments, the liquid crystal cell of the optical assembly has a cell gap of 6 μm to 10 μm, that is, a distance between the first substrate 100 and the second substrate 200 is from 6 μm to 10 μm.

In at least some embodiments, the focal point of the first liquid crystal lens 20 and the focal point of the second liquid crystal lens 30 are on a same side of the optical assembly. For example, the focal points of the first liquid crystal lens 20 and the second liquid crystal lens 30 are both located on a light incident side of the optical assembly, to form a concave lens for diverging light, and a double-layer concave lens has larger divergence angle, as illustrated in FIG. 1. For another example, the focal points of the first liquid crystal lens and the second liquid crystal lens are located on a light emission side of the optical assembly, to form a convex lens for concentrating light, and a double-layer concave lens also has larger convergence angle.

In at least some embodiments, the focal points of the first liquid crystal lens and the second liquid crystal lens are located on different sides. For example, the first liquid crystal lens 20 is located on a light incident side of the optical assembly, and the second liquid crystal lens 30 is located on a light emission side of the optical assembly, or vice versa.

When the optical assembly is applied to an anti-peeping display device, the focal points of the first liquid crystal lens 20 and the second liquid crystal lens 30 are controlled by a transverse driving electric field to be located on a light incident side of the optical assembly, to form a concave lens for diverging light, so that a sharing display mode is realized, referring to FIG. 1. When no driving electric field is applied, the optical assembly does not adjust the light (see FIG. 2), so that an anti-peeping display mode is realized.

In this way, when the optical assembly of the embodiment of the present disclosure is applied to the anti-peeping display device, switching between the anti-peeping display mode and sharing display mode can be realized, and user experience is increased.

In at least some embodiments, the focal points of the first liquid crystal lens and the second liquid crystal lens are controlled by a transverse driving electric field to be both located on a light emission side of the optical assembly, to form a convex lens for concentrating light, thereby realizing an anti-peeping mode having smaller viewing angle.

In the embodiment, a position of the first electrode 1 is configured to be in one-to-one correspondence with a position of the second electrode 2, so that the electrodes on the first substrate 100 and the second substrate 200 are completely consistent in spatial distribution, and the mura problem is overcome, referring to FIG. 1 and FIG. 3. Further, the position of the set of first electrodes may be configured to be in one-to one correspondence with the position of the set of second electrodes, so that a position of the first liquid crystal lens 20 is in one-to-one correspondence with a position of the second liquid crystal lens 30. When the first liquid crystal lens 20 and the second liquid crystal lens 30 are of a same type of lens structure, the first electrode 1 and the second electrode 2 having the positions corresponding to each other may be supplied with a same voltage, so that a first electric field formed by the first electrode 1 and a second electric field formed by the second electrode 2 have a same distribution, and mutual influence between the electric fields is reduced, and a focal position of the first liquid crystal lens 20 corresponds to a focal position of the second liquid crystal lens 30, thereby enhancing adjustment effect on light.

In a specific exemplary implementation, as illustrated in FIG. 1, each set of the first electrodes consists of two first electrodes 1, and each set of the second electrodes consists of two second electrodes 2. For example, voltages having opposite polarities are applied to the respective two first electrodes 1 of each set of first electrodes; and voltages having opposite polarities are applied to the respective two second electrodes 2 of each set of second electrodes. For example, the left and right first electrodes 1 are supplied with a positive voltage and a negative voltage, respectively; and the left and right second electrodes 2 are supplied with a positive voltage and a negative voltage, respectively Taking the first liquid crystal lens 20 as an example, a principle of forming the first liquid crystal lens 20 is as below. A driving electric field is generated between the two first electrodes 1 of each set of first electrodes, and liquid crystal molecules are arranged along electric field lines. The liquid crystal molecules at a position proximal to the first electrode 1 have relatively small retardation amount (i.e., a deflecting angle of a liquid crystal molecule), and liquid crystal molecules at a position corresponding to a middle position between the two first electrodes 1 have relatively large retardation amount, so that the liquid crystal molecules between the two first electrodes 1 may have a gradual change in the retardation amount, thereby forming a liquid crystal lens. The retardation amount of the liquid crystal molecule may be determined by the following equation: $f=p2/(8*\Delta n*d)$, where f is a focal length of the liquid crystal lens, p is a distance between the two first electrodes 1, $\Delta n*d$ is a retardation amount. A desired retardation amount of the liquid crystal molecule is obtained by adjusting the voltage of the first electrode 1, so as to form a liquid crystal lens having a desired focal length.

A principle of forming the second liquid crystal lens 30 is same as that of the first liquid crystal lens 20, which will not be repeated in detail herein.

In at least some embodiments, voltages having same polarity and voltage difference may be applied to the respective two first electrodes 1 of each set of first electrodes; and voltages having same polarity and voltage difference may be applied to the respective two second electrodes 2 of each set of the second electrodes, so as to form a driving electric field.

Optionally, a position of the at least one set of first electrodes may be configured to be in one-to-one correspondence with a position of the at least one set of second electrodes, and a position of the first electrode 1 is in one-to-one correspondence with a position of the second electrode 2, and the first electrode 1 and the second electrode 2 having the positions corresponding to each other are supplied with a same voltage, i.e., the voltages have same magnitude and same polarity, so that a first electric field generated by the first electrodes 1 and a second electric field generated by the second electrodes 2 have same distribution without affecting each other. As a result, the first liquid crystal lens 20 and the second liquid crystal lens 30 are of a same type, both being convex lens or concave lens, and focal points of the two have positions corresponding to each other, thereby enhancing adjustment effect on light.

In another specific exemplary implementation, as illustrated in FIG. 3, the at least one set of first electrodes comprises at least three first electrodes 1 distributed evenly. Voltages having same polarity are applied to the at least three first electrodes 1 of each set of the first electrodes. The voltages of the at least three first electrodes 1 are increased firstly and then decreased in an arrangement direction of the at least three first electrodes 1, and an absolute value of a voltage difference between two adjacent first electrodes 1 is increased firstly and then decreased, too. In each set of first electrodes, the voltage difference between the two adjacent first electrodes 1 is relatively small, so that corresponding liquid crystal molecule has a relatively small retardation amount. The voltage difference between the two adjacent first electrodes 1 is relatively large, so that a corresponding liquid crystal molecule has a relatively large retardation amount. In this way, a gradual change in the retardation amount is formed, and a liquid crystal lens is formed. For example, the at least one set of first electrodes comprises an odd number of first electrodes, and an electrode in a center has a highest voltage, and electrodes on both sides of the center have voltages decreased successively. As illustrated in FIG. 3, the at least one set of first electrodes consists of seven first electrodes 1 distributed evenly. In the arrangement direction of the seven first electrodes 1, the $1^{st}$ first electrodes 1 to $7^{th}$ first electrodes are supplied with voltages of 1V, 3V, 6V, 12V, 6V, 3V, and 1V, respectively. Herein, "distributed evenly" refers to having a same interval in a certain direction. For example, in a horizontal direction, the plurality of the first electrodes 1 have the same interval.

Based on the same principle, it is also possible to provide that the at least one set of second electrodes comprises at least three second electrodes 2 distributed evenly, and a working principle thereof is same as those described with the at least one set of first electrodes of FIG. 3, which will not be repeated in detail herein.

Optionally, a position of the at least one set of first electrodes may be configured to be in one-to-one correspondence with a position of the at least one set of second electrodes, and a position of the first electrode 1 may be in one-to-one correspondence with a position of the second electrode 2, and the first electrode 1 and the second electrode 2 having the positions corresponding to each other are supplied with a same voltage, i.e., the voltages have same magnitude and same polarity, so that a first electric field generated by the first electrodes 1 and a second electric field generated by the second electrodes 2 have same distribution without affecting each other. As a result, the first liquid crystal lens 20 and the second liquid crystal lens 30 are of a same type, both being convex lens or concave lens, and focal points of the two have positions corresponding to each other, thereby enhancing adjustment effect on light.

In each of the two exemplary implementation described above, the number of the first electrodes 1 in the at least one set of first electrodes is equal to the number of the second electrodes 2 in the at least one set of second electrodes, and the position of each first electrode 1 is in one-to-one correspondence with the position of each second electrode 2. While the first electrode 1 and the second electrode 2 having the positions corresponding to each other are supplied with a same voltage, the first liquid crystal lens 20 and the second liquid crystal lens 30 of a same type are formed, and a position of the first liquid crystal lens 20 is in one-to-one correspondence with a position of the second liquid crystal lens 30, thereby enhancing adjustment effect on light. In addition, the first electrode 1 and the second electrode 2 having the positions corresponding to each other and being supplied with a same voltage can further ensure that the first electric field generated by the first electrodes 1 and the second electric field generated by the second electrodes 2 are distributed evenly without affecting each other.

Another embodiment of the present disclosure provides a display device, comprising a display panel and the optical assembly in the embodiment described above. The optical assembly is disposed on a display side of the display panel and configured for switching a size of a viewing angle of the display device, so as to realize switching between an anti-peeping mode and a sharing display mode, thereby increasing user experience.

In at least some embodiments, positions of a first liquid crystal lens and a second liquid crystal lens formed in the optical assembly are in one-to-one correspondence with each other and of a same type, so as to enhance adjustment effect on light.

In at least some embodiments, a position of each first liquid crystal lens is configured to be in one-to-one correspondence with a position of a pixel unit 40 of the display device, so that display light of each pixel unit 40 is adjusted, thereby increasing image quality. Each pixel unit 40 comprises a plurality of sub-pixel units, for example, a red sub-pixel unit 41, a green sub-pixel unit 42 and a blue sub-pixel unit 43.

Taking an anti-peeping display device having a viewing angle of ±30° as an example, the display device comprises the optical assembly according to the afore-mentioned embodiment of the present disclosure. The optical assembly forms a double-layer concave lens structure. In case that a focal length of the concave lens is approximately 52 μm, the viewing angle is increased and becomes ±50°.

It can be contemplated for a person skilled in the art that, without considering the mura problem, the display panel may comprise at least two optical assemblies, which are laminated on the display side of the display panel, in this way the adjustment effect on display light can be further enhanced. For example, when it is applied to an anti-peeping display device, the viewing angle of the sharing mode may be further increased.

Still another embodiment of the present disclosure provides a method for driving the afore-mentioned display device, comprising:

applying voltages to the at least two first electrodes of each set of first electrodes, to form the first electric field being configured for driving liquid crystal molecules proximal to the first substrate to deflect, so as to form the first liquid crystal lens; and applying voltages to the at least two second electrodes of each set of second electrodes, to form the second electric field being configured for driving liquid crystal molecules proximal to the second substrate to deflect, so as to form the second liquid crystal lens.

In the method of the embodiment, the deflection of liquid crystal molecules are driven by a transverse electric field, so that the liquid crystals proximal to each substrate form a liquid crystal lens, and thus the liquid crystal cell serves as a double-layer liquid crystal lens structure. Because the two substrates in one liquid crystal cell have high alignment accuracy, it is ensured that the electrodes on the respective substrates are consistent in spatial distribution, thereby solving the mura problem.

For example, a position of the at least one set of first electrodes is configured to be in one-to-one correspondence with a position of the at least one set of second electrodes, and a position of the first electrode 1 is in one-to-one correspondence with a position of the second electrode 2, and the first electrode 1 and the second electrode 2 having the positions corresponding to each other are supplied with a same voltage, so that a first electric field generated by the first electrodes 1 and a second electric field formed by the second electrodes 2 are same distribution without affecting each other. A position of the first liquid crystal lens is in one-to-one correspondence with a position of the second liquid crystal lens, thereby enhancing adjustment effect on light. In another aspect, because the position of each first electrode is in one-to-one correspondence with the position of each second electrode, it can be ensured that the electrodes on the first substrate and the second substrate are completely consistent in spatial distribution, and the mura problem is solved.

Figure 4:
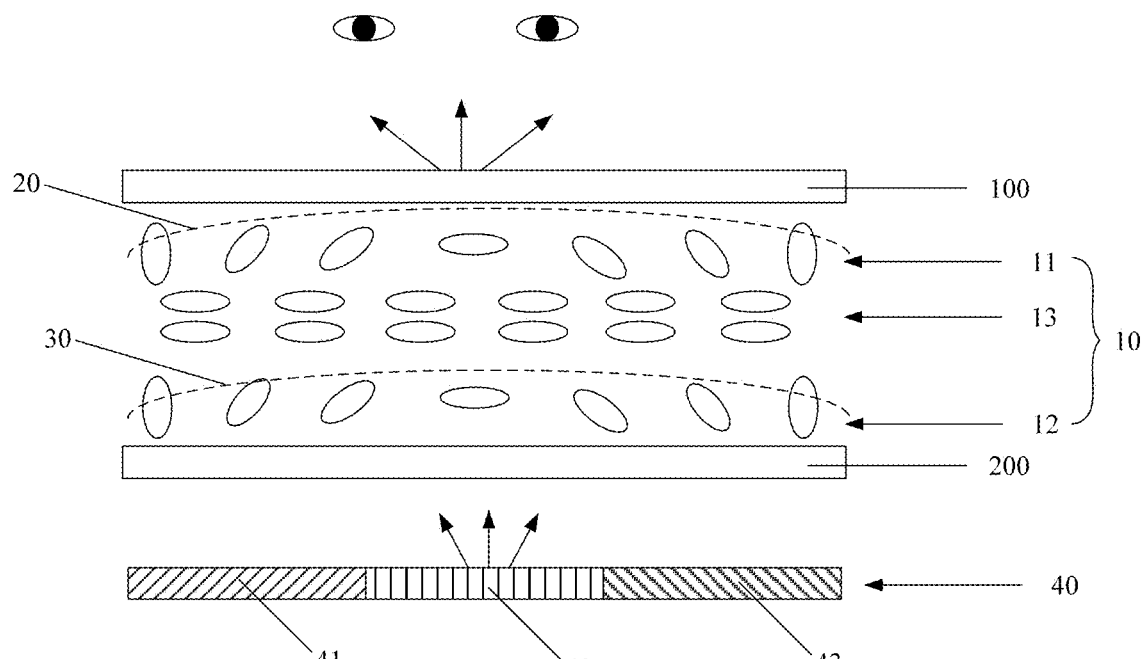
FIG. 4 is a structural schematic diagram of a display device when a voltage is applied according to an embodiment of the present disclosure.
Figure 5:
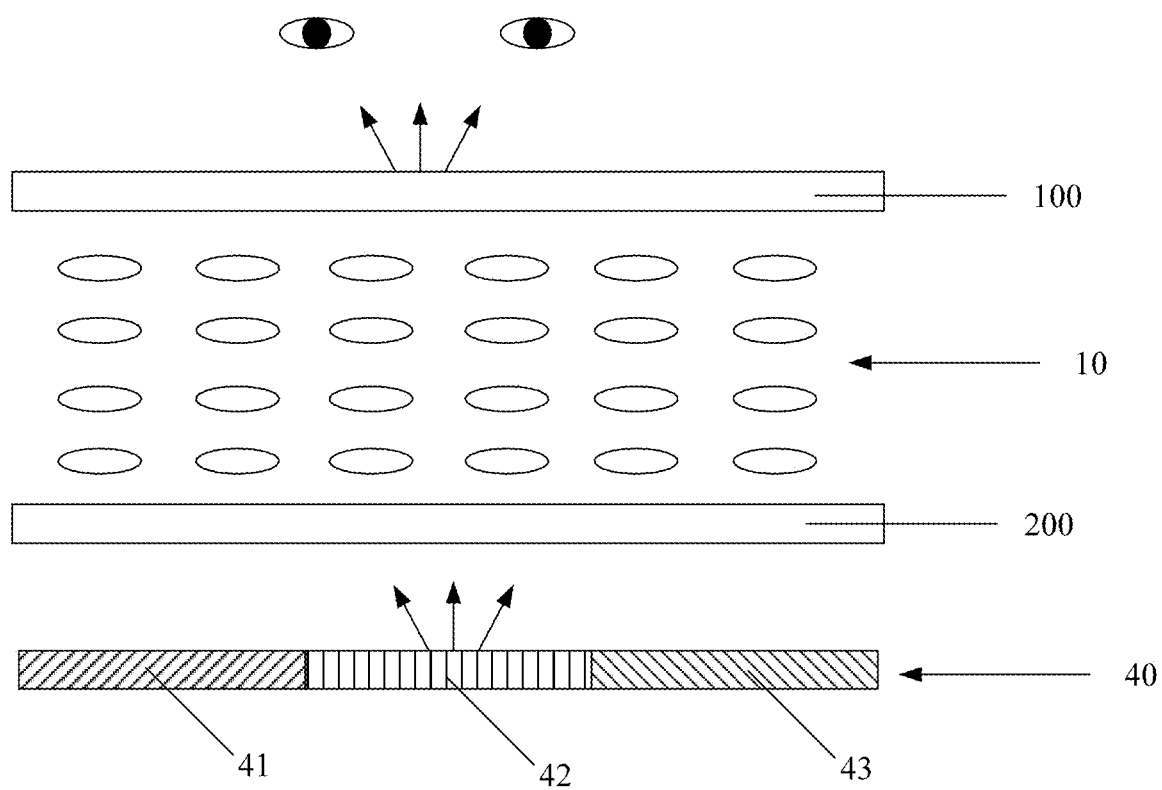
FIG. 5 is a structural schematic diagram of a display device when no voltage is applied according to an embodiment of the present disclosure.

In the case that the display device is an anti-peeping display device, voltages are applied to the first electrodes 1 and the second electrodes 2, and focal points of the formed first liquid crystal lens 20 and second liquid crystal lens 30 are controlled to be on a side of the optical assembly proximal to the display panel, in this way, the first liquid crystal lens 20 and second liquid crystal lens 30 each forms a concave lens, and the optical assembly is configured to diverge display light, so as to realize a sharing display mode, as illustrated in FIG. 4. When no voltage is applied to the first electrodes 1 and the second electrodes 2, the optical assembly does not adjust the light (referring to FIG. 5), the display mode of the display device is switched from the sharing display mode to the anti-peeping display mode, and user experience is increased.

In at least some embodiments, by applying voltages to the first electrodes 1 and the second electrodes 2, focal points of the formed first liquid crystal lens 20 and second liquid crystal lens 30 may be also controlled to be on a side of the optical assembly distal to the display panel, in this way, the first liquid crystal lens 20 and second liquid crystal lens 30 each forms a convex lens, and the optical assembly is configured for concentrating the display light, so as to realize an anti-peeping mode having a smaller viewing angle.

In a specific exemplary implementation, each set of first electrodes consists of two first electrodes 1, and each set of second electrodes consists of two second electrodes 2 (see FIG. 1);

As illustrated in FIG. 4, the method for driving the display device comprises:

applying voltages having opposite polarities to the two first electrodes 1 of each set of first electrodes; and applying voltages having opposite polarities to the two second electrodes 2 of each set of second electrodes.

In the embodiment, the liquid crystal molecules proximal to any one of the first and second substrates are driven to deflect by a transverse driving electric field and are arranged along the electric field lines, the transverse driving electric field is generated between the two electrodes on the any one of the first and second substrates. The liquid crystal molecules at positions proximal to the two electrodes have a small retardation amount, and the liquid crystal molecules at a position between the two electrodes have a large retardation amount, so that a gradual change in the retardation amount is generated in the liquid crystal molecules between the two electrodes, thereby forming a liquid crystal lens.

In the embodiment, optionally, a position of the at least one set of first electrodes is configured to be in one-to-one correspondence with a position of the at least one set of second electrodes, and a position of the first electrode 1 is in one-to-one correspondence with a position of the second electrode 2, and the first electrode 1 and the second electrode 2 having the positions corresponding to each other are supplied with a same voltage, so that a first electric field generated by the first electrodes 1 and a second electric field generated by the second electrodes 2 have same distribution without affecting each other. As a result, the first liquid crystal lens 20 and the second liquid crystal lens 30 are of a same type, both being convex lens or concave lens, and focal points of the two have positions corresponding to each other, thereby enhancing adjustment effect on light.

In another specific exemplary implementation, the at least one set of first electrodes comprises at least three first electrodes, and the at least one set of second electrodes comprises at least three second electrodes;

As illustrated in FIG. 3, the method for driving the display device comprises:

applying voltages having same polarity to the at least three first electrodes 1 of each set of first electrodes, the voltages being increased firstly and then decreased in an arrangement direction of the at least three first electrodes 1, and an absolute value of a voltage difference between two adjacent first electrodes 1 being increased firstly and then decreased, too; and applying voltages having same polarity to the at least three second electrodes 2 of each set of the second electrodes, the voltages being increased firstly and then decreased in an arrangement direction of the at least three second electrodes 2, and an absolute value of a voltage difference between two adjacent second electrodes 2 being increased firstly and then decreased, too;

In the embodiment, the liquid crystal molecules proximal to any one of the first and second substrates are driven to deflect by a transverse driving electric field and are arranged along the electric field lines, the transverse driving electric field is generated by the at least three electrodes on the any one of the first and second substrates. A voltage difference between two adjacent electrodes is relatively small, so that a corresponding liquid crystal molecule has a relatively small retardation amount; and the voltage difference between the two adjacent electrodes is relatively large, so that the corresponding liquid crystal molecule has a relatively large retardation amount, and thus a gradual change in the retardation amount is generated, so as to form a liquid crystal lens.

In the embodiment, optionally, a position of the at least one set of first electrodes is configured to be in one-to-one correspondence with a position of the at least one set of second electrodes, and a position of the first electrode is in one-to-one correspondence with a position of the second electrode, and the first electrode 1 and the second electrode having the positions corresponding to each other are supplied with a same voltage, so that a first electric field generated by the first electrodes and a second electric field generated by the second electrodes have same distribution without affecting each other. As a result, the first liquid crystal lens and the second liquid crystal lens are of a same type, both being convex lens or concave lens, and focal points of the two have positions corresponding to each other, thereby enhancing adjustment effect on light.

In the embodiments of the present disclosure, the electrodes are formed on the two substrates disposed opposite to each other, and voltages are applied to the electrodes on each substrate to form a transverse electric field for driving the liquid crystal molecules proximal to the substrate to deflect, so that the liquid crystal proximal to each substrate may form a liquid crystal lens, and thus a liquid crystal cell may be configured for forming a double-layer liquid crystal lens structure. Because the two substrates of one liquid crystal cell have high alignment accuracy, the electrodes on the two substrates may be ensured to be consistent in spatial distribution, thereby solving the mura problem.

Herein, the following statements should be noted:

(1) The accompanying drawings involve only the structure(s) in connection with the embodiment(s) of the present disclosure, and other structure(s) can be referred to common design(s).

(2) For the purpose of clarity only, in accompanying drawings for illustrating the embodiment(s) of the present disclosure, the thickness and a size of a layer or area may be enlarged or narrowed, that is, the drawings are not drawn in a real scale.

(3) In case of no conflict, features in one embodiment or in different embodiments can be combined as a new embodiment.

The invention claimed is:

1. An anti-peeping display device, comprising:
a display panel; and
an optical assembly disposed on a display side of the display panel, comprising:
a first substrate and a second substrate, disposed opposite to each other;
liquid crystals, filled between the first substrate and the second substrate;
at least one set of first electrodes, disposed on the first substrate and comprising at least two first electrodes, the at least two first electrodes being configured to form a first electric field for driving liquid crystal molecules proximal to the first substrate to deflect, so as to form a first liquid crystal lens; and
at least one set of second electrodes, disposed on the second substrate and comprising at least two second electrodes, the at least two second electrodes being configured to form a second electric field for driving liquid crystal molecules proximal to the second substrate to deflect, so as to form a second liquid crystal lens,
wherein both the first electric field and the second electric field are transverse electric fields,
wherein the first liquid crystal lens and the second liquid crystal lens are of a same type, both being a concave lens, and focal points of the first liquid crystal lens and the second liquid crystal lens have positions corresponding to each other.

2. The anti-peeping display device according to claim 1, wherein positions of the at least two first electrodes are in one-to-one correspondence with positions of the at least two second electrodes.

3. The anti-peeping display device according to claim 2, wherein each set of the at least one set of the first electrodes consists of two first electrodes, and each set of the at least one set of the second electrodes consists of two second electrodes.

4. The anti-peeping display device according to claim 2, wherein the at least one set of the first electrodes comprises at least three first electrodes distributed evenly and configured to be applied with at least three different voltages respectively, and the at least one set of the second electrodes comprises at least three second electrodes distributed evenly and configured to be applied with the at least three different voltages respectively.

5. The anti-peeping display device according to claim 1, wherein a position of the at least one set of the first electrodes is in one-to-one correspondence with a position of the at least one set of the second electrodes.

6. A method for driving the display device according to claim 1, comprising:

applying voltages to the at least two first electrodes of each set of the at least one set of the first electrodes, to form the first electric field for driving liquid crystal molecules proximal to the first substrate to deflect, so as to form the first liquid crystal lens; and applying voltages to the at least two second electrodes of each set of the at least one set of the second electrodes, to form the second electric field for driving liquid crystal molecules proximal to the second substrate to deflect, so as to form the second liquid crystal lens.

7. The method according to claim 6, wherein each set of the at least one set of the first electrodes consists of two first electrodes, and each set of the at least one set of the second electrodes consists of two second electrodes.

8. The method according to claim 7, comprising applying voltages having opposite polarities to the two first electrodes of each set of the at least one set of the first electrodes, respectively; and applying voltages having opposite polarities to the two second electrodes of each set of the at least one set of the second electrodes, respectively.

9. The method according to claim 6, wherein the at least one set of the first electrodes comprises at least three first electrodes, and the at least one set of the second electrodes comprises at least three second electrodes, the at least three first electrodes are applied with at least three different voltages respectively, and the at least three second electrodes are applied with the at least three different voltages respectively.

10. The method according to claim 9, comprising:

applying voltages having same polarity to the at least three first electrodes of each set of the at least one set of the first electrodes, the voltages being increased firstly and then decreased in a distribution direction of the at least three first electrodes, and an absolute value of a voltage difference between two adjacent first electrodes being also increased firstly and then decreased; and applying voltages having same polarity to the at least three second electrodes of each set of the at least one set of the second electrodes, the voltages being increased firstly and then decreased in a distribution direction of the at least three second electrodes, and an absolute value of a voltage difference between two adjacent second electrodes being also increased firstly and then decreased.

11. The method according to claim 6, wherein a position of the at least one set of the first electrodes is in one-to-one correspondence with a position of the at least one set of the second electrodes, a position of each first electrode corresponds to a position of one of the second electrodes, and each first electrode and each second electrode are supplied with a same voltage.

* * * * *